(12) United States Patent
Zimmerman et al.

(10) Patent No.: US 9,299,020 B2
(45) Date of Patent: Mar. 29, 2016

(54) FINANCIAL TRANSACTION CARD WITH CUTOUT PATTERN REPRESENTING SYMBOLIC INFORMATION

(71) Applicant: TheCARD LLC, Cincinnati, OH (US)

(72) Inventors: Israel H. Zimmerman, Los Angeles, CA (US); James M. Gould, Cincinnati, OH (US); Aaron C. Tucker, Cincinnati, OH (US)

(73) Assignee: TheCARD LLC, Cincinnati, OH (US)

( * ) Notice: Subject to any disclaimer, the term of this patent is extended or adjusted under 35 U.S.C. 154(b) by 0 days.

(21) Appl. No.: 14/219,680

(22) Filed: Mar. 19, 2014

(65) Prior Publication Data
US 2015/0269465 A1 Sep. 24, 2015

(51) Int. Cl.
| | |
|---|---|
| *G06K 5/00* | (2006.01) |
| *G06K 7/08* | (2006.01) |
| *G06K 19/06* | (2006.01) |
| *G06K 19/04* | (2006.01) |
| *G06K 19/02* | (2006.01) |

(52) U.S. Cl.
CPC .............. *G06K 19/042* (2013.01); *G06K 19/02* (2013.01)

(58) Field of Classification Search
USPC .......................... 235/380, 449, 493, 451, 492
See application file for complete search history.

(56) References Cited

U.S. PATENT DOCUMENTS

| | | | | |
|---|---|---|---|---|
| 3,831,008 | A | * | 8/1974 | Bradshaw ...................... 235/451 |
| 4,671,515 | A | * | 6/1987 | Burgess ..................... A63F 1/02 273/150 |
| 5,198,646 | A | * | 3/1993 | Kunimoto ..................... 235/449 |
| 5,531,482 | A | * | 7/1996 | Blank ................ B42D 15/0053 156/701 |
| 5,650,209 | A | | 7/1997 | Ramsburg et al. |
| D394,387 | S | | 5/1998 | Williams |
| 6,224,108 | B1 | | 5/2001 | Klure |
| 6,315,206 | B1 | | 11/2001 | Hansen et al. |
| 6,390,372 | B1 | | 5/2002 | Waters |
| 7,398,931 | B2 | | 7/2008 | Lasch et al. |
| D604,359 | S | | 11/2009 | Santos |
| 7,677,458 | B2 | | 3/2010 | Lindahl et al. |
| 7,954,715 | B2 | | 6/2011 | Narendra et al. |
| 8,515,815 | B2 | | 8/2013 | Chenot |
| 2003/0095705 | A1 | * | 5/2003 | Weast ............................ 382/167 |
| 2005/0006481 | A1 | * | 1/2005 | Han et al. ...................... 235/487 |
| 2006/0018467 | A1 | * | 1/2006 | Steinmetz ............... G06F 21/34 380/54 |
| 2006/0151348 | A1 | | 7/2006 | Willard |
| 2007/0063052 | A1 | | 3/2007 | Chakiris et al. |
| 2013/0019450 | A1 | * | 1/2013 | Rassouli .................. A45C 1/06 29/428 |

* cited by examiner

*Primary Examiner* — Tuyen K Vo
(74) *Attorney, Agent, or Firm* — Walter W. Duft

(57) ABSTRACT

A financial transaction card includes a card substrate formed as a material sheet having first and second substantially planar card faces bounded by a peripheral edge. A machine-readable financial information storage device is on or within the material sheet. The storage device stores card specific data in digital machine readable form. Human readable symbolic information is viewable on the first and second card faces. At least one item of the symbolic information is formed as a cutout pattern of one or more light-transmitting apertures extending completely through the material sheet.

25 Claims, 4 Drawing Sheets

FINANCIAL TRANSACTION CARD WITH CUTOUT PATTERN REPRESENTING SYMBOLIC INFORMATION

BACKGROUND

1. Field of the Invention

The present invention relates to financial transaction cards, including but not limited to credit cards, debit cards, gift cards, stored value cards, and the like.

2. Description of the Prior Art

By way of background, financial transaction cards typically display a variety of human-readable symbolic information, such as a card number, a cardholder name, a card issuer name, an expiration date, a trademark and/or logo, etc., on one or both of the card surfaces. This symbolic information is usually applied to the card substrate via screen printing or other conventional techniques, with some of the information also being embossed on the upper card surface. In order to read such printed information, sufficient ambient light is required to illuminate the card and reflect the information to the eye of the reader. If the lighting is insufficient, the information cannot be discerned, which makes it difficult if not impossible to identify the card. This means that it may be inconvenient to use the card at some locations, such as in a darkened restaurant or night club, particularly for card users who may be color blind or have other vision deficiencies or impairments.

It is also the case that entities offering financial transaction cards, such as financial institutions, retailers, telephone service providers and other card purveyors, are interested in offering financial transaction cards that have a pleasing and distinctive visual appearance. The perceived advantage of such cards is the ability to offer a product that is unique in the marketplace, and which will impart status to the card customer relative to other card users who have more mundane cards. A card purveyor offering an attractive, visually distinct card can potentially attract customers who will preferentially select such a card over competitive cards that are less attractive, and thereby derive income as a result of increased card utilization.

Finally, financial transaction card fraud remains a continuing problem. If a card holder's account information is stolen, it may be possible to create a forged credit card that can be used for unauthorized purchases. If a financial transaction card is lost or stolen, the card holder's signature could be erased or a new signature panel could be applied to the card. The card could then be signed by an unauthorized user in their own handwriting, making it easier to verify the signature during unauthorized use.

It is to improvements in financial transaction cards, and particularly the display of human-readable symbolic information on such cards, that the present disclosure is directed.

SUMMARY

In one aspect of the disclosed subject matter, an improved financial transaction card includes a card substrate formed as a material sheet having first and second substantially planar card faces bounded by a peripheral edge. A machine-readable financial information storage device is provided on or within the material sheet. The storage device stores card specific data in digital machine readable form. Human readable symbolic information is viewable on the first and second card faces. At least one item of the symbolic information is formed as a cutout pattern of one or more light-transmitting apertures extending completely through the material sheet.

In an example embodiment, the cutout pattern comprises block letters.

In another example embodiment, the cutout pattern comprises cursive letters.

In another example embodiment, the cutout pattern comprises only letters.

In another example embodiment, the cutout pattern comprises only numerals.

In another example embodiment, the cutout pattern comprises a combination of letters and numerals.

In another example embodiment, the cutout pattern comprises a combination of letters and punctuation marks.

In another example embodiment, the cutout pattern comprises a card logo.

In another example embodiment, the cutout pattern comprises a card issuer name.

In another example embodiment, the cutout pattern comprises a card number.

In another example embodiment, the cutout pattern comprises a card holder name.

In another example embodiment, the cutout pattern comprises a card holder signature.

In another example embodiment, the material sheet comprises one or more metal layers.

In another example embodiment, the material sheet comprises one or more thermoplastic layers.

In another example embodiment, a sidewall of the aperture(s) reveals an interior of the material sheet. In this embodiment, the material sheet may comprise a visually identifiable interior material or marking that serves as a card authentication indicator that can be seen on the aperture sidewall.

In another example embodiment, the storage device comprises one or more of a magnetic stripe or an integrated circuit device.

In another example embodiment, the financial transaction card additionally includes a signature panel on the material sheet.

In a further aspect of the disclosed subject matter, an improved financial transaction card includes a card substrate formed as a material sheet having first and second substantially planar card faces bounded by a peripheral edge. A machine-readable financial information storage device is provided on or within the material sheet. The storage device stores card specific data in digital machine readable form. A signature panel is provided on the material sheet. Human readable symbolic information is viewable on the first and second card faces. At least one item of the symbolic information is formed as a cutout pattern of one or more apertures extending completely through the material sheet as empty, unfilled and uncovered openings that allow light and air to pass therethrough. The cutout pattern comprises one or more of block letters, cursive letters, numerals, and punctuation marks.

In a further aspect of the disclosed subject matter, a method of use is provided for a financial transaction card having a material sheet formed with a cutout pattern of one or more light-transmitting apertures extending completely through the material sheet, the cutout pattern representing human readable symbolic information. In accordance with the method, the card is held between a reader and a light source, with a first face of the card facing the reader and a second face of the card facing the light source. The light source is substantially blocked by the material sheet except where the cutout pattern is formed. The cutout pattern is thereby back-lit by the light source such that the symbolic information is readable by the reader, and the reader reads the symbolic information formed as the cutout pattern.

In an example embodiment, the symbolic information comprises non-confidential card authentication information that allows the reader to determine card authenticity.

In another example embodiment, the first card face bears non-apertured printed information that is confidential to the reader, and the card is read in an environment where there is insufficient light illuminating the first card face to reveal the confidential information while the non-confidential symbolic information is read with the card being held between the reader and the light source.

In a further aspect of the disclosed subject matter, another method of use is provided for a financial transaction card having a material sheet formed with a cutout pattern of one or more light-transmitting apertures extending completely through the material sheet, the cutout pattern representing human readable symbolic information. In accordance with the method, the card is placed on a background surface of selected color and brightness, with a first face of the card facing a reader and a second face of the card facing the background surface. The background surface is substantially blocked by the material sheet except where the cutout pattern is formed. The cutout pattern is thereby viewable due to the background surface color and brightness such that the symbolic information is readable by the reader, and the reader reads the symbolic information formed as the cutout pattern.

In an example embodiment, the background color and brightness are selected to allow a reader who is visually deficient or impaired discern the symbolic information.

In another example embodiment, the background color and brightness are selected to allow a reader who is color blind discern the symbolic information.

DETAILED DESCRIPTION OF EXAMPLE EMBODIMENTS

As used herein, a "financial transaction card" refers to a card having the purpose of conducting financial transactions associated with payment, such as a credit card, a debit card, a stored value card such as a gift card or telephone card, etc. A financial transaction is specifically designed and intended to remain in the ultimate possession of a cardholder. Each financial transaction card bears unique information such as a card number, a cardholder name, as well as machine-readable data. Financial transaction card physical characteristics, performance, and use may be governed by one or more of the following standards and test methods: ISO/IEC7810, ISO/IEC7811, ISO/IEC7813, and ISO/IEC10373. A financial transaction card is typically configured as a rigid planar sheet of desired shape, usually made of thermoplastic material (with metal or other materials also being an option), having dimensions less than 5 inches×5 inches and a thickness between 0.005" and 0.100." The most typical form factor is rectangular and is suitable for carrying the card in a purse or wallet. Such cards generally measure about 2.125"×3.375"× 0.030", and have rounded corners. Financial transaction cards comprising other shapes, sizes and materials are also within the scope of the present disclosure, and it should be understood that the above-listed properties of "typical" financial transaction cards are mentioned solely for purposes of example.

Figure 1:
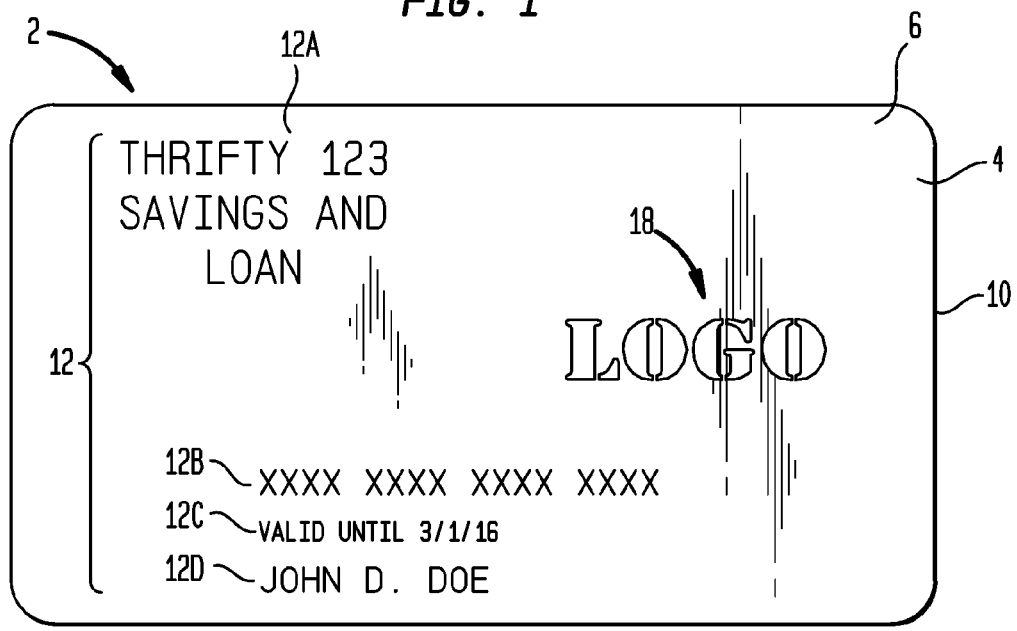
FIG. 1 is a plan view showing the front face an example financial transaction card with a cutout pattern representing a card logo.
Figure 2:
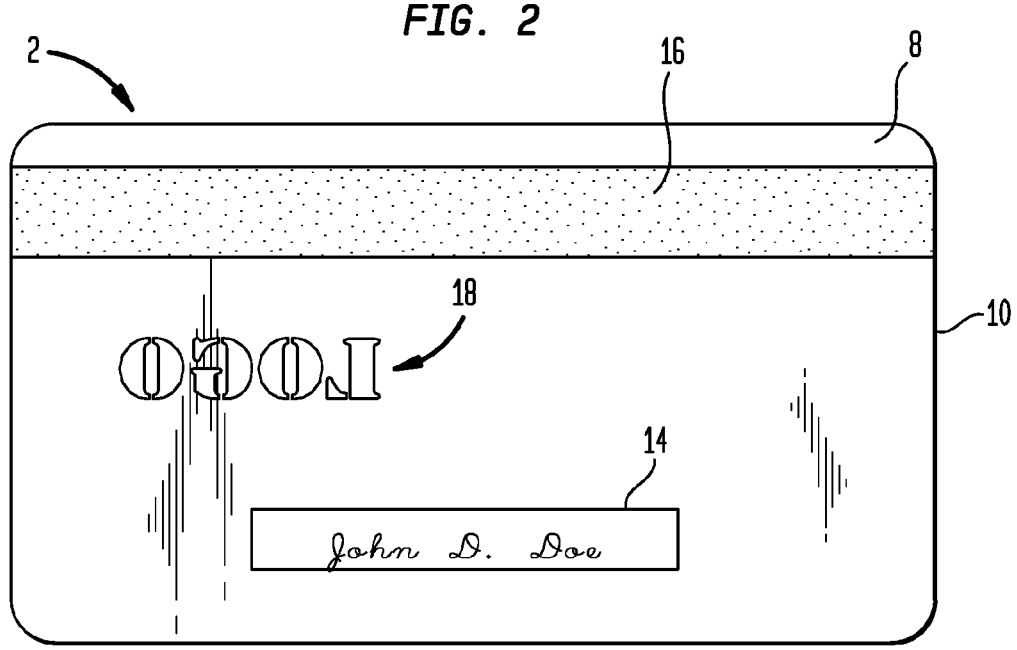
FIG. 2 is a plan view showing the rear face of the example financial transaction card of FIG. 1.

Turning now to the drawing figures, wherein like reference numerals are used to represent like elements in all of the several views, FIGS. 1-2 illustrate a financial transaction card 2 constructed in accordance with one example embodiment. The financial transaction card 2 includes a card substrate formed as a material sheet 4 having first and second substantially planar card faces 6 and 8 separated by a card thickness dimension and bounded by a peripheral edge 10. The peripheral edge 10 may be continuous and substantially linear, as shown in the drawing figures, or it may be wholly or partially non-linear and/or interrupted (e.g., such as by forming the edge with pockets, bulges, or other convex or concave geometries). In FIGS. 1 and 2, the first card face 6 represents a front side of the card and the second card face 8 represents the card's rear side. The material sheet 4 can be formed of any suitably rigid material. One example would be a thermoplastic polymer such as polyvinyl chloride (PVC), polyethylene terephthalate glycolized (PETG), or the like. Another example would be a metal material. Suitable metal materials include but are not limited to titanium, palladium, and other metals and alloys. Combinations of materials may also be used, such as a thermoplastic material containing a metal inlay or dispersed metal particulates to add weight. Carbon material (e.g., graphite or fiber) is another option. In some constructions, the material sheet 4 may be formed as a single layer of material. In other constructions, multiple layers may be used. For example, in a thermoplastic polymer construction, the material sheet 4 could be constructed as a laminate comprising one or more thermoplastic core sheets. The core sheet(s) may be disposed between a pair of thermoplastic overlay sheets, which may be transparent. Such overlay sheets may also be used in cases where the material sheet 4 has a metal or carbon construction, as this may help reduce scratching and marring.

As shown in FIGS. 1 and 2, intelligible human readable symbolic information 12 is viewable on both of the card faces 6 and 8. Most of the symbolic information 12 will typically be printed on the financial transaction card 2 using a suitable printing technique (e.g., screen printing). In some cases, the symbolic information may be printed in combination with colored backgrounds, graphics and/or images (not shown) in order to render the financial transaction card 2 more visually appealing. If the material sheet 4 is constructed with transparent overlay sheets, the printed information will typically be applied to the outer surfaces of the underlying core sheet(s), and the overlay sheets will cover the printed subject matter to serve as protective layers. If overlay sheets are not used, as may be the case when the material sheet 4 is made from metal, the printing may be applied directly to the material sheet's outer surfaces, such that no protective layers are provided.

As shown in FIG. 1, examples of the symbolic information 12 that may be viewable on the first face 6 of the material sheet 4 include a card issuer name 12A, an account number 12B, validation information 12C, and a customer name 12D. At least in Western countries, this information will be typically be alphanumeric in nature. As used herein, "alphanumeric information" refers to information that may comprise all letters (uppercase, lowercase or both), all numerals, or a combination of letters and numerals, as well as punctuation marks. The term "letter" as used herein refers to any character used in any alphabetic written language system to impart information when displayed alone or arranged in combination with other characters in a particular order or sequence. The term "numeral" as used herein refers to any symbol that represents numeric information. It will be appreciated that alphanumeric information represents only one type of symbolic information that is intelligible to human readers. Other types of symbolic information that may be present on the financial transaction card 2 include characters from non-alphabetic written languages (e.g., syllabogram or logogram characters), as well as non-language symbols such as graphical trademarks, logos, insignias, emblems, and the like that convey information.

As shown in FIG. 2, the financial transaction card 2 may also include a signature panel 14. FIG. 2 shows that the signature panel 14 has been signed by a cardholder for security purposes. This signature represents another form of alphanumeric information that may be provided on the financial transaction card 2. The financial transaction card 2 may further include a magnetic stripe 16 that is readable from the card's rear face 8. The magnetic stripe 16 represents one type of machine-readable financial information storage device that may be provided on or within the material sheet 4 in order to store unique card-specific data in digital machine readable form. Examples of such data include financial information relating to a card user account, including but not limited to identification data, credit data, debit data, etc. The magnetic stripe 16 is adapted to be read using a conventional card swiper as commonly found in stores, restaurants and other establishments. Other machine readable financial information storage or reference devices, such as a microchip integrated circuit device (smart chip), a barcode, a radio frequency identification tag, etc., could also be provided.

If the rear side of the material sheet 4 has a transparent overlay sheet, the magnetic stripe 16 will typically be positioned below the sheet (for protection purposes) whereas the signature panel 14 will typically be placed above the sheet so that it can be signed by the card user. Although not shown, other items such as hologram stamps, embossments, and other devices could also be added to the financial transaction card 2.

As described by way of background above, the symbolic information typically found on financial transaction cards, such as the information items 12A, 12B, 12C, and 12D, as well as the information represented by the cardholder signature on the signature panel 14, will not be readable if there is insufficient ambient light to adequately illuminate the card faces 4 and 6. In order to address this issue, and also to improve card aesthetics as well as address the problem of financial transaction card fraud, it is proposed herein that one or more items of intelligible human readable symbolic information viewable on the financial transaction card 2 be formed, in lieu of normal printing, as a cutout pattern of one or more light-transmitting apertures extending completely through the material sheet 4 so as to allow light to pass through the card from one face 6 to the other face 8. The symbolic information that may be formed in the above manner includes both alphanumeric symbolic information (such as letters and numerals) and non-alphanumeric symbolic information (such as non-alphabetic language characters and symbols as well as non-language symbols such as graphical trademarks, logos, insignias, emblems and the like that nonetheless convey information to human readers).

In an example construction, the one or more apertures that comprise the cutout pattern will be constituted as one or more openings that have no card material therein (i.e., the one or more apertures will comprise one or more empty, unfilled and uncovered openings that extend completely through the material sheet 4 so as to allow light and air to pass therethrough). In alternative constructions, the one or more apertures might be covered by or filled with a solid light transmissive material (such as a transparent or translucent thermoplastic polymer), such that the one or more apertures are closed yet can still pass light. In some cases, if the material sheet 4 is a laminate comprising transparent overlay sheets, the one or more apertures could extend through the material sheet's inner core sheets and be either covered or not covered by the overlay sheets.

The one or more apertures of the cutout pattern may be formed in various ways, including die cutting or stamping, milling, or any other suitable technique that does not bend, warp, mutilate or otherwise compromise card appearance or function. The cutout pattern will be strategically placed so as not to interfere with other components of the financial transaction card 2 (such as the signature panel 14 and the magnetic stripe 16), and also to avoid problems with automated teller machines and other devices that use infrared light sensors to detect card insertion.

The number, shape and size of the one or more apertures that comprise the cutout pattern may vary, depending on design preferences. It will be appreciated that certain symbolic information formed by the one or more apertures may have closed loops, such as the letter "O." Such apertures can be formed as stencils (e.g., with bridges and islands) in order to more clearly display the information. Alternatively, such apertures could be formed as simple openings (e.g., with the letter "O" being formed as a circle) yet still be intelligible to readers. Another alternative would be to form the one or more apertures using a dot matrix pattern in which each character of the cutout pattern comprises many small apertures arranged in a character shape.

One example of a cutout pattern representing symbolic information is shown by reference number 18 in FIGS. 1 and 2. In this example, the cutout pattern comprises letters that represent a financial transaction card logo or trademark, with each aperture of the pattern representing one block letter. As can be seen in FIG. 2, a characteristic of forming symbolic information as a cutout pattern of one or more apertures extending completely through the material sheet 4 is that a reverse image of the symbolic information will be visible on one side of the material sheet. This property imparts uniqueness to the financial transaction card 2.

Figure 3:
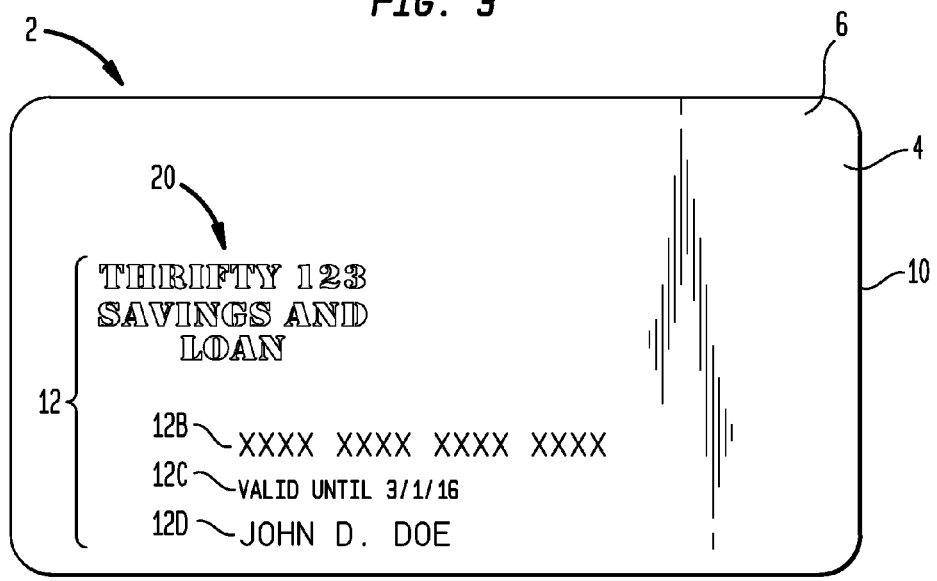
FIG. 3 is a plan view showing the front face of another example financial transaction card with a cutout pattern identifying a card issuer.

Another example of a cutout pattern representing symbolic information is shown by reference number 20 in FIG. 3. In this example, the cutout pattern comprises a combination of letters and numerals that identify a card issuer, with each aperture of the pattern representing either a block letter or a numeral.

Figure 4:
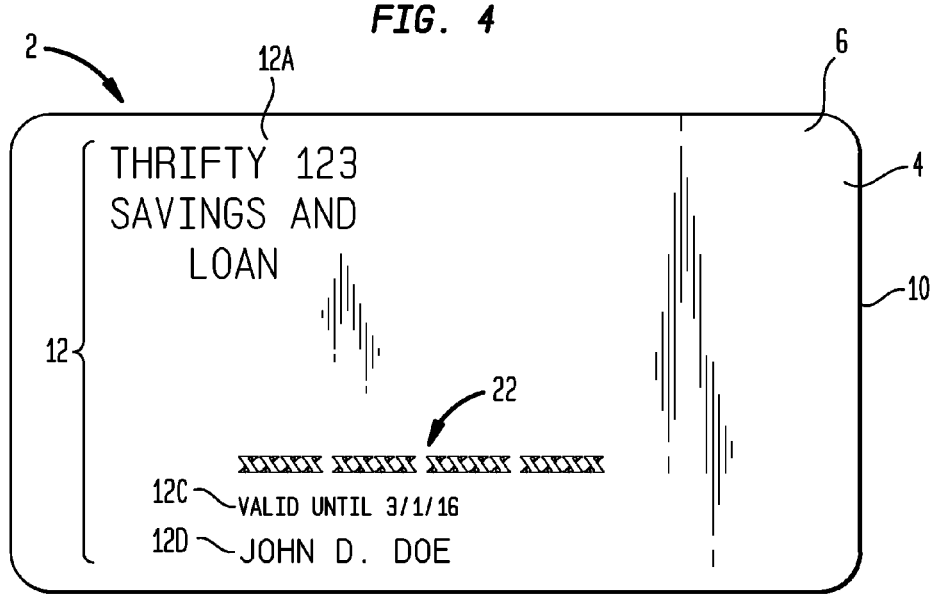
FIG. 4 is a plan view showing the front face of another example financial transaction card with a cutout pattern representing a card number.

Another example of a cutout pattern representing symbolic information is shown by reference number 22 in FIG. 4. In this example, the cutout pattern comprises numerals that represent a card number, with each aperture of the pattern representing a numeral.

Figure 5:
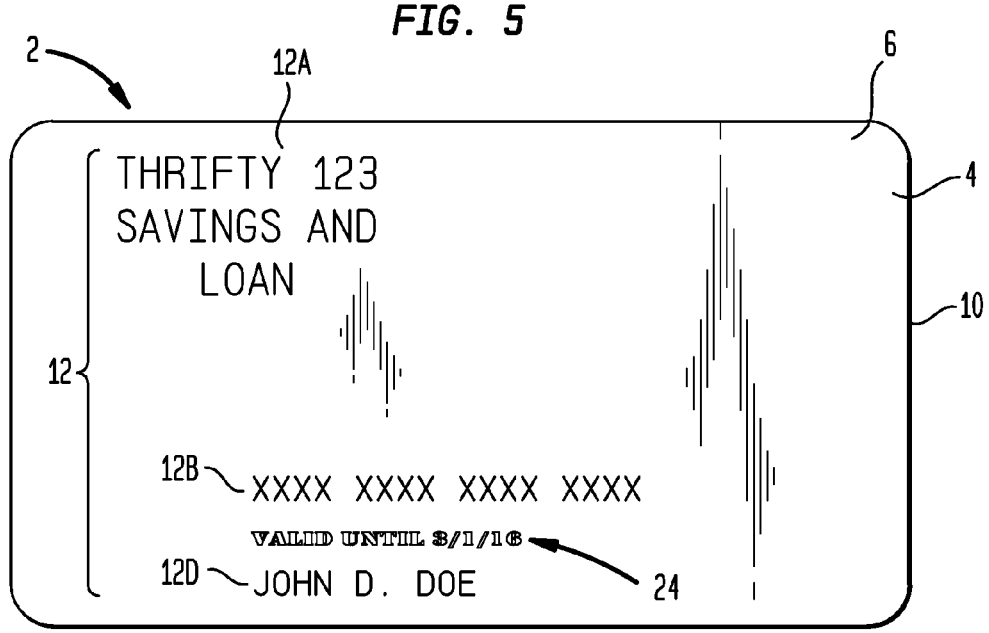
FIG. 5 is a plan view showing the front face of another example financial transaction card with a cutout pattern representing card validation information.

Another example of a cutout pattern representing symbolic information is shown by reference number 24 in FIG. 5. In this example, the cutout pattern comprises letters, numerals and punctuation marks that represent card validation information, with each aperture of the pattern representing either a block letter, a numeral or a punctuation mark.

Figure 6:
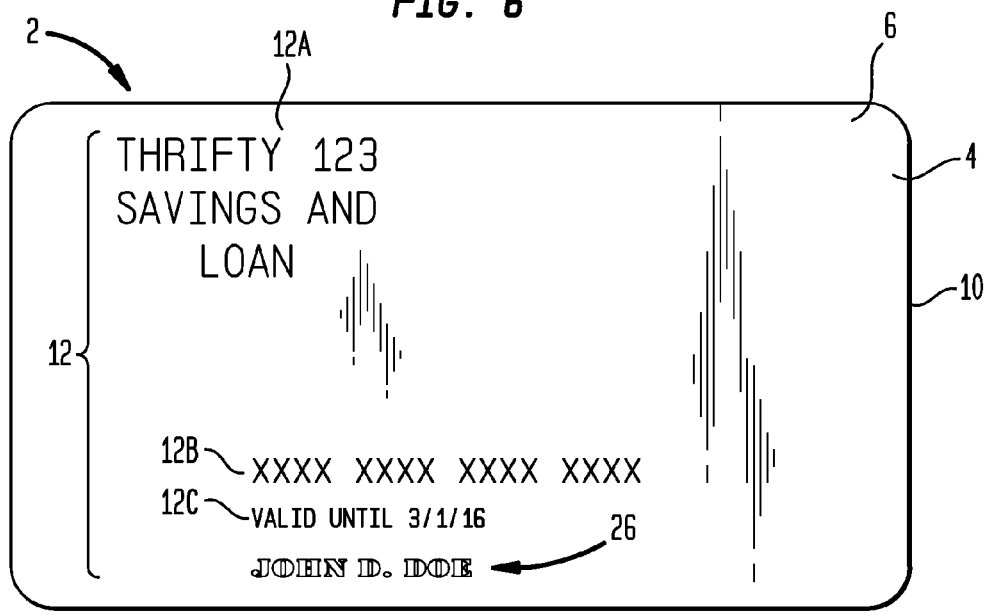
FIG. 6 is a plan view showing the front face of another example financial transaction card with a cutout pattern representing a cardholder name.

Another example of a cutout pattern representing symbolic information is shown by reference number 26 in FIG. 6. In this example, the cutout pattern comprises letters and punctuation marks that represent a cardholder name, with each aperture of the pattern representing either a block letter or a punctuation mark.

Figure 7:
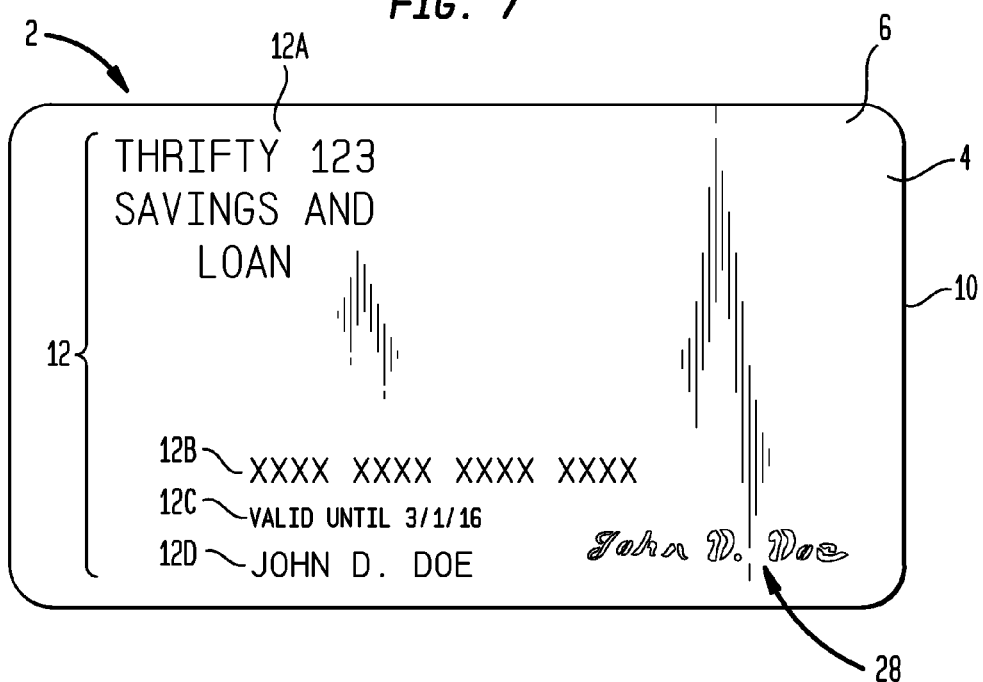
FIG. 7 is a plan view showing the front face of another example financial transaction card with a cutout pattern representing a cardholder signature.

Another example of a cutout pattern representing symbolic information is shown by reference number 28 in FIG. 7. In this example, the cutout pattern comprises cursive letters that represent a cardholder signature, with each aperture of the pattern representing a cursive letter.

The use of a cutout pattern to provide symbolic information on the financial transaction card 2 addresses the low ambient lighting problem mentioned by way of background above. This is because the financial transaction card 2 lends itself to a method of use in which the card can be positioned in front of even a very dim light source, and the symbolic information represented by the cutout pattern will be viewable in silhouette due to the back-lighting provided by the light source. No front-lighting is required. This has the added benefit of allowing the financial transaction card 2 to be identified without revealing sensitive information printed in normal fashion on the card face 6 or 8 that is on the opposite side of the light source.

For example, the cutout pattern could comprise a non-confidential card issuer name or logo that could be viewed via the back-lighting in order to authenticate the card, whereas the card number and other confidential information printed on the card would remain unviewable, both to the naked eye and to cameras or other photo or video capture devices, provided the card 2 is read in an environment where there is insufficient light to reveal the confidential information while the non-confidential information represented by the cutout pattern is being read with the card held between the reader and the light source.

In accordance with another method of use, the financial transaction card 2 could be used by a person with who is color blind or otherwise visually deficient or impaired. In accordance with this method, the card 2 would be placed on a contrast-enhancing background surface of selected color and brightness. The cardholder may not be able to read any of the card's conventionally printed information (e.g., due to the printing colors used, poor lighting conditions, etc.) but would be able to interpret the symbolic information represented by the cutout pattern if the background surface is of a color and brightness that the cardholder can discern.

With respect to card appeal and marketability, the cutout patterns will impart a pleasing and distinctive visual appearance to the financial transaction card 2 insofar as the patterned symbolic information will be vividly differentiated from the remaining printed information. The financial transaction card 2 may thus be marketed by a card purveyor as a unique product that imparts status to the cardholder relative to other card users who have more mundane financial transaction cards with only conventionally printed information.

With respect to fraud, computer-assisted cloning technology is presently available that allows unauthorized persons to duplicate conventional financial transaction cards. With the financial transaction card 2 having symbolic information formed as a cutout pattern, the card would be difficult to duplicate without the use of sophisticated fabrication equipment to properly form the one or more cutout pattern apertures from non-apertured sheet stock. Relatedly, it would also be difficult to alter the cutout pattern of an existing financial transaction card 2. Again, sophisticated fabrication equipment would be needed. The cutout pattern will tend to require a complicated pattern formation technique due to the complex aperture shape(s) needed to form the desired symbolic information characters. In many cases, this will be significantly more involved than merely cutting a hole or other simple opening.

A further advantage relative to fraud detection is that the sidewalls of the cutout pattern aperture(s) will reveal the interior of the material sheet 4, provided no opaque coatings are applied to the sidewalls following pattern formation. This property of the financial transaction card 2 can be used to verify the authenticity of the material(s) used to fabricate the material sheet 4. For example, in a high-end financial transaction card made from a metal such as titanium or palladium, the cost of the material is quite high. Without the cutout pattern, a financial transaction card could be made with a cheaper core material on the inside and then covered with the expensive metal on the outside. To further inhibit forgery, the interior of the material sheet 4 could be colored or formed with some other visually identifiable inner material (e.g., an insert) whose presence could be verified by checking the cutout pattern sidewalls.

Figure 8:
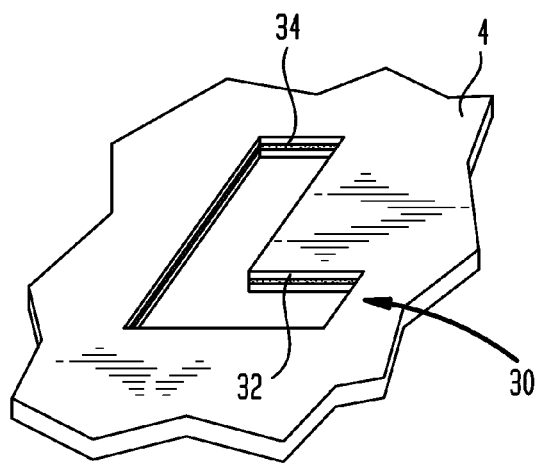
FIG. 8 is a perspective view showing a portion of a financial transaction card material sheet, with a cutout pattern comprising an aperture with a visible sidewall to review an interior portion of the material sheet.

For example, FIG. 8 shows a cutout pattern comprising a single aperture 30 that forms the capital letter "L" in the material sheet 4. The sidewall 32 of the aperture 30 is visible. As discussed, there are advantages associated with being able to view the material sheet interior in order to verify the authenticity of the materials used. FIG. 8 further shows that the interior of the material sheet 4 is colored or formed with some other visually identifiable inner material whose presence could be verified by checking the cutout pattern aperture sidewalls. This card authentication indicator is shown by reference number 34 in FIG. 8. It could be formed as an insert (e.g., a special layer) within the material sheet 4, or in any other suitable manner.

Accordingly, a financial transaction card having a cutout pattern representing symbolic information has been disclosed, together with related methods of use. Although various embodiments have been shown and described, it should be apparent that many variations and alternative embodiments could be implemented in accordance with this disclosure. It is understood, therefore, that the invention is not to be in any way limited except in accordance with the spirit of the appended claims and their equivalents.

What is claimed is:

1. A financial transaction card, comprising:
   a card substrate formed as a material sheet having first and second substantially planar card faces bounded by a peripheral edge;
   a machine-readable financial information storage device on or within said material sheet, said storage device storing card specific data in digital machine readable form;
   human readable symbolic information viewable on said first and second card faces; and
   at least one item of said symbolic information being formed as a cutout pattern of one or more light-transmitting apertures extending completely through said material sheet.

2. The financial transaction card of claim 1, wherein said cutout pattern comprises written language characters.

3. The financial transaction card of claim 1, wherein said cutout pattern comprises alphanumeric letters and numerals.

4. The financial transaction card of claim 1, wherein said cutout pattern comprises block letters.

5. The financial transaction card of claim 1, wherein said cutout pattern comprises cursive letters.

6. The financial transaction card of claim 1, wherein said cutout pattern comprises only letters.

7. The financial transaction card of claim 1, wherein said cutout pattern comprises only numerals.

8. The financial transaction card of claim 1, wherein said cutout pattern comprises a combination of letters and numerals.

9. The financial transaction card of claim 1, wherein said cutout pattern comprises a combination of letters and punctuation marks.

10. The financial transaction card of claim 1, wherein said cutout pattern comprises a card logo.

11. The financial transaction card of claim 1, wherein said cutout pattern comprises a card issuer name.

12. The financial transaction card of claim 1, wherein said cutout pattern comprises a card number.

13. The financial transaction card of claim 1, wherein said cutout pattern comprises a cardholder name.

14. The financial transaction card of claim 1, wherein said cutout pattern comprises a cardholder signature.

15. The financial transaction card of claim 1, wherein said material sheet comprises one or more metal layers.

16. The financial transaction card of claim 1, wherein said material sheet comprises one or more thermoplastic layers.

17. The financial transaction card of claim 1, wherein a sidewall of said one or more apertures reveals an interior of said material sheet.

18. The financial transaction card of claim 17, wherein said material sheet comprises a visually identifiable interior material or marking formed on an interior of said material sheet that serves as a card authentication indicator that can be seen on said aperture sidewall.

19. A financial transaction card, comprising:
- a card substrate formed as a material sheet having first and second substantially planar card faces bounded by a peripheral edge;
- a machine-readable financial information storage device on or within said material sheet, said storage device storing card specific data in digital machine readable form and comprising a magnetic stripe;
- a signature panel on said material sheet;
- human readable symbolic information viewable on said first and second card faces;
- at least one item of said symbolic information being formed as a cutout pattern of one or more apertures extending completely through said material sheet as empty, unfilled and uncovered openings that allow light and air to pass therethrough; and
- said cutout pattern comprising one or more of block letters, cursive letters, numerals, and punctuation marks.

20. A method of using a financial transaction card having a material sheet formed with a cutout pattern of one or more light-transmitting apertures extending completely through said material sheet, said cutout pattern representing human readable symbolic information, comprising:
- holding said card between a human reader and a light source, with a first face of said card facing said human reader and a second face of said card facing said light source;
- said light source being substantially blocked by said material sheet except where said cutout pattern is formed;
- said cutout pattern being back-lit by said light source such that said symbolic information is readable by said human reader; and
- said human reader reading said symbolic information formed as said cutout pattern.

21. The method of claim 20 wherein said symbolic information comprises non-confidential card authentication information that allows said human reader to determine card authenticity.

22. The method of claim 21 wherein said first card face bears non-apertured printed information that is confidential to said human reader, and said card is read in an environment where there is insufficient light illuminating said first card face to reveal said confidential information while said non-confidential symbolic information is read with said card being held between said human reader and said light source.

23. A method of using a financial transaction card having a material sheet formed with a cutout pattern of one or more light-transmitting apertures extending completely through said material sheet, said cutout pattern representing human readable symbolic information, comprising:
- placing said card on a background surface of selected color and brightness, with a first face of said card facing a human reader and a second face of said card facing said background surface;
- said background surface being substantially blocked by said material sheet except where said cutout pattern is formed;
- said cutout pattern being viewable due to said background surface color and brightness such that said symbolic information is readable by said human reader; and
- said human reader reading said symbolic information formed as said cutout pattern.

24. The method of claim 23 wherein said background color and brightness are selected to allow a human reader who is visually deficient or impaired discern said symbolic information.

25. The method of claim 23 wherein said background color and brightness are selected to allow a human reader who is color blind discern said symbolic information.

* * * * *